US011799931B2

(12) United States Patent
Allen

(10) Patent No.: US 11,799,931 B2
(45) Date of Patent: *Oct. 24, 2023

(54) PROVIDING RELATED CONTENT USING A PROXY MEDIA CONTENT ITEM

(71) Applicant: Spotify AB, Stockholm (SE)

(72) Inventor: Vincent Arther Allen, Brooklyn, NY (US)

(73) Assignee: Spotify AB, Stockholm (SE)

( * ) Notice: Subject to any disclaimer, the term of this patent is extended or adjusted under 35 U.S.C. 154(b) by 472 days.

This patent is subject to a terminal disclaimer.

(21) Appl. No.: 16/452,980

(22) Filed: Jun. 26, 2019

(65) Prior Publication Data

US 2020/0412782 A1    Dec. 31, 2020

Related U.S. Application Data

(63) Continuation of application No. 16/451,780, filed on Jun. 25, 2019.

(51) Int. Cl.
*H04N 21/2387* (2011.01)
*H04L 65/613* (2022.01)
(Continued)

(52) U.S. Cl.
CPC .............. *H04L 65/612* (2022.05); *G06N 3/02* (2013.01); *H04L 9/40* (2022.05); *H04L 65/613* (2022.05);
(Continued)

(58) Field of Classification Search
CPC ............... H04L 65/4084; H04L 69/329; H04L 65/4092; H04L 67/2842; H04L 67/42;
(Continued)

(56) References Cited

U.S. PATENT DOCUMENTS 6,545,209 B1 * 4/2003 Flannery ................. G06F 16/68
84/611
8,258,390 B1 * 9/2012 Gossweiler ........... G06F 16/639
84/602
(Continued)

OTHER PUBLICATIONS

Allen, Final Office Action, U.S. Appl. No. 16/451,780, dated May 18, 2022, 20 pgs.
(Continued)

*Primary Examiner* — William G Trost, IV
*Assistant Examiner* — Adam A Cooney
(74) *Attorney, Agent, or Firm* — Morgan, Lewis & Bockius LLP

(57) ABSTRACT

A server system receives an indication of a media content item from a device and determines a first set of values that correspond to characteristics of the indicated media content item. The method further includes analyzing a defined set of media content items to identify a proxy content item. The identified proxy media content item has a second set of values that meets similarity criteria for the first set of values. The method includes generating, from the defined set of media content items, a result set of media content items that are associated with the proxy media content item. The method also includes determining a result set of users of the media content provider associated with the result set of media content items and transmitting, to the device of the user, information associated with the result set of users of the media content provider.

21 Claims, 11 Drawing Sheets

(51) Int. Cl.
  *H04L 67/56* (2022.01)
  *H04L 65/612* (2022.01)
  *H04L 69/329* (2022.01)
  *G06N 3/02* (2006.01)
  *H04W 40/24* (2009.01)
  *H04L 9/40* (2022.01)
  *H04L 67/01* (2022.01)
  *H04L 67/563* (2022.01)
  *H04L 67/568* (2022.01)

(52) U.S. Cl.
  CPC .............. *H04L 67/01* (2022.05); *H04L 67/56* (2022.05); *H04L 67/563* (2022.05); *H04L 67/568* (2022.05); *H04L 69/329* (2013.01); *H04N 21/2387* (2013.01); *H04W 40/242* (2013.01)

(58) Field of Classification Search
  CPC . H04N 21/84; H04N 21/4826; H04N 21/8352
  See application file for complete search history.

(56) References Cited

U.S. PATENT DOCUMENTS

| | | | | |
|---|---|---|---|---|
| 8,903,843 | B2* | 12/2014 | Farrelly | G06F 16/433 707/767 |
| 9,589,237 | B1* | 3/2017 | Qamar | G06Q 30/0631 |
| 9,753,988 | B1* | 9/2017 | McGilliard | G06F 16/24578 |
| 2005/0038819 | A1* | 2/2005 | Hicken | G11B 27/105 |
| 2006/0265421 | A1 | 11/2006 | Ranasinghe et al. | |
| 2008/0089299 | A1* | 4/2008 | Lindsley | H04L 67/04 370/338 |
| 2008/0162147 | A1* | 7/2008 | Bauer | G06F 16/4387 704/275 |
| 2008/0288255 | A1* | 11/2008 | Carin | G06K 9/6297 704/256.1 |
| 2009/0006397 | A1* | 1/2009 | Lehtiniemi | G06F 16/335 |
| 2009/0049082 | A1* | 2/2009 | Slaney | G06F 16/634 |
| 2010/0070917 | A1 | 3/2010 | Gates et al. | |
| 2011/0060738 | A1 | 3/2011 | Gates et al. | |
| 2011/0125763 | A1* | 5/2011 | Takanen | G06Q 10/00 707/E17.014 |
| 2012/0023403 | A1* | 1/2012 | Herberger | G06F 16/683 715/716 |
| 2012/0030230 | A1 | 2/2012 | Sheinkop et al. | |
| 2014/0067827 | A1* | 3/2014 | Bilinski | G06F 16/639 707/736 |
| 2014/0223099 | A1* | 8/2014 | Kidron | G06F 16/435 711/118 |
| 2014/0229894 | A1* | 8/2014 | Vinna | G06F 16/639 715/810 |
| 2015/0213018 | A1* | 7/2015 | Sanio | G06F 16/639 707/802 |
| 2016/0142783 | A1* | 5/2016 | Bagga | H04N 21/4532 725/47 |
| 2016/0357864 | A1* | 12/2016 | Venkataraman | G06Q 30/0631 |
| 2018/0018397 | A1 | 1/2018 | Cody et al. | |
| 2018/0025005 | A1* | 1/2018 | Cao | G06F 16/48 707/734 |
| 2018/0285933 | A1* | 10/2018 | Lee-Chan | G06Q 30/0269 |
| 2018/0330249 | A1 | 11/2018 | Hajiyev et al. | |
| 2018/0341704 | A1* | 11/2018 | Barkan | G06F 16/639 |
| 2018/0349011 | A1* | 12/2018 | Morag | G06F 21/604 |

OTHER PUBLICATIONS

Allen, Office Action, U.S. Appl. No. 16/451,780, dated Oct. 18, 2021, 17 pgs.

* cited by examiner

500

At a server system of a media-providing service, the server system having one or more processors and memory storing instructions for execution by the one or more processors: ⎯ 502

Receive an indication of a media content item from a device of a user of a media content provider. ⎯ 504

| The indicated content item is a content item that has not been previously provided to the media content provider. ⎯ 506

| Receiving the indication of the media content item includes receiving the media content item. ⎯ 508

Determine a first set of values that correspond to the characteristics of the indicated content item. ⎯ 510

| The characteristics of the indicated content item include one or more characteristics selected from the group consisting of: a degree to which a track is acoustic, a strength of a beat, a degree to which a track sounds choppy, suitability for dancing, positions of a track where downbeats occur, duration of a track, average dynamic range, a measure of energy of a track, a degree to which the twelve pitches are balanced, a degree to which a track contains vocals, key, a degree to which a live audience is present, loudness, a degree of consistency of timing, fade-in point, fade-out point, modal scale, suitability for running, a degree to which a track includes spoken words, tempo, time signature, and a degree to which a track is cheerful. ⎯ 512

Analyze a defined set of content items to identify a proxy content item. The identified proxy content item has a second set of values that meets similarity criteria for the first set of values. ⎯ 514

| The similarity criteria include criteria that are met in accordance with a determination that the second set of values has a closest vector distance in vector space to the first set of values. ⎯ 516

| The indicated content item is distinct from the defined set of content items. ⎯ 518

| The defined set of content items includes one or more playlists. ⎯ 520

702 — At an electronic device associated with a media-providing service having one or more processors and memory storing instructions for execution by the one or more processors:

704 — Receive an indication of a content item from a device of a first user of a media content provider.

706 — Determine a first set of values that correspond to characteristics of the indicated content item

708 — Analyze a defined set of content items to identify a proxy content. The identified proxy content item has a second set of values that meets similarity criteria for the first set of values.

710 — The indicated content item is distinct from the defined set of content items.

712 — The defined set of content items includes content items of the media content provider that meet playback criteria.

714 — The similarity criteria include criteria that are met in accordance with a determination that the second set of values has a closest vector distance in vector space to the first set of values.

716 — Generate, from the defined set of content items, a result set of content items. The result set of content items includes content items that are associated with the proxy content item.

PROVIDING RELATED CONTENT USING A PROXY MEDIA CONTENT ITEM

RELATED APPLICATION

This application is a continuation of U.S. application Ser. No. 16/451,780 filed Jun. 25, 2019, which is incorporated by reference herein in its entirety.

TECHNICAL FIELD

The disclosed embodiments relate generally to media playback, and, in particular, to identifying media content that is related to a new media content item by using a proxy for the new media content item.

BACKGROUND

Access to electronic media, such as music and video content, has expanded dramatically over time. As a departure from physical media, media content providers stream media to electronic devices across wireless networks, improving the convenience with which users can digest and experience such content.

A user that has consumed content from a media content provider may wish to receive recommendations for additional content available from the provider. To assist users in discovering new content, media content providers may assess similarities between content items in a library of currently available content. In this way, a media content provider can recommend a content item from the library that is similar to content a user has obtained in the past.

SUMMARY

There is a need for systems and methods of identifying media content related to a content item that is newly received by a media-providing service. By selecting a proxy media content item from a set of content items (e.g., a library of content that is currently available from a media provider), based on similarities between the proxy media content item and the new media content item, a media content provider is enabled to use listening history data to determine media content that is related to the new content item (e.g., without a need to wait for the new media content item to be consumed by users of the media-providing service).

In accordance with some embodiments, a method is performed at a server system of a media-providing service. The server system has one or more processors and memory storing instructions for execution by the one or more processors. The method includes receiving an indication of a media content item from a device of a first of a media content provider and determining a first set of values that correspond to characteristics of the indicated media content item. The method further includes analyzing a defined set of media content items to identify a proxy content. The identified proxy media content item has a second set of values that meets similarity for the first set of values. The method includes generating, from the defined set of media content items, a result set of media content items. The result set of media content items includes media content items that are associated with the proxy media content item. The method also includes determining a result set of users of the media content provider associated with the result set of content items and transmitting, to the device of the first user, information associated with the result set of users of the media content provider.

In accordance with some embodiments, an electronic device (e.g., a server system, a client device, etc.) includes one or more processors and memory storing one or more programs configured to be executed by the one or more processors. The one or more programs include instructions for receiving an indication of a media content item from a device of a first of a media content provider and determining a first set of values that correspond to characteristics of the indicated media content item. The one or more programs further include instructions for analyzing a defined set of media content items to identify a proxy content. The identified proxy media content item has a second set of values that meets similarity for the first set of values. The one or more programs further include instructions for generating, from the defined set of media content items, a result set of media content items. The result set of media content items includes media content items that are associated with the proxy media content item. The one or more programs further include instructions for determining a result set of users of the media content provider associated with the result set of content items and transmitting, to the device of the first user, information associated with the result set of users of the media content provider.

In accordance with some embodiments, a computer-readable storage medium has stored therein instructions that, when executed by an electronic device, cause the server system to receive an indication of a media content item from a device of a first of a media content provider and determining a first set of values that correspond to characteristics of the indicated media content item. The computer-readable storage medium further includes instructions that cause the server system to analyze a defined set of media content items to identify a proxy content. The identified proxy media content item has a second set of values that meets similarity for the first set of values. The computer-readable storage medium further includes instructions that cause the server system to generate, from the defined set of media content items, a result set of media content items. The result set of media content items includes media content items that are associated with the proxy media content item. The computer-readable storage medium further includes instructions that cause the server system to determine a result set of users of the media content provider associated with the result set of content items and transmit, to the device of the first user, information associated with the result set of users of the media content provider.

Thus, systems are provided with improved methods for providing information associated with media content items based on a proxy media content item.

BRIEF DESCRIPTION OF THE DRAWINGS

The embodiments disclosed herein are illustrated by way of example, and not by way of limitation, in the figures of the accompanying drawings. Like reference numerals refer to corresponding parts throughout the drawings and specification.

FIGS. 5A-5C are flow diagrams illustrating methods for providing information associated with a result set of media content items, in accordance with some embodiments.

FIGS. 7A-7C are flow diagrams illustrating methods for providing a result set of users, in accordance with some embodiments.

DETAILED DESCRIPTION

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are used only to distinguish one element from another. For example, a first characteristic could be termed a second characteristic, and, similarly, a second characteristic could be termed a first characteristic, without departing from the scope of the various described embodiments. The first characteristic and the second characteristic are both characteristics, but they are not the same characteristic.

The terminology used in the description of the various embodiments described herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

Figure 1:
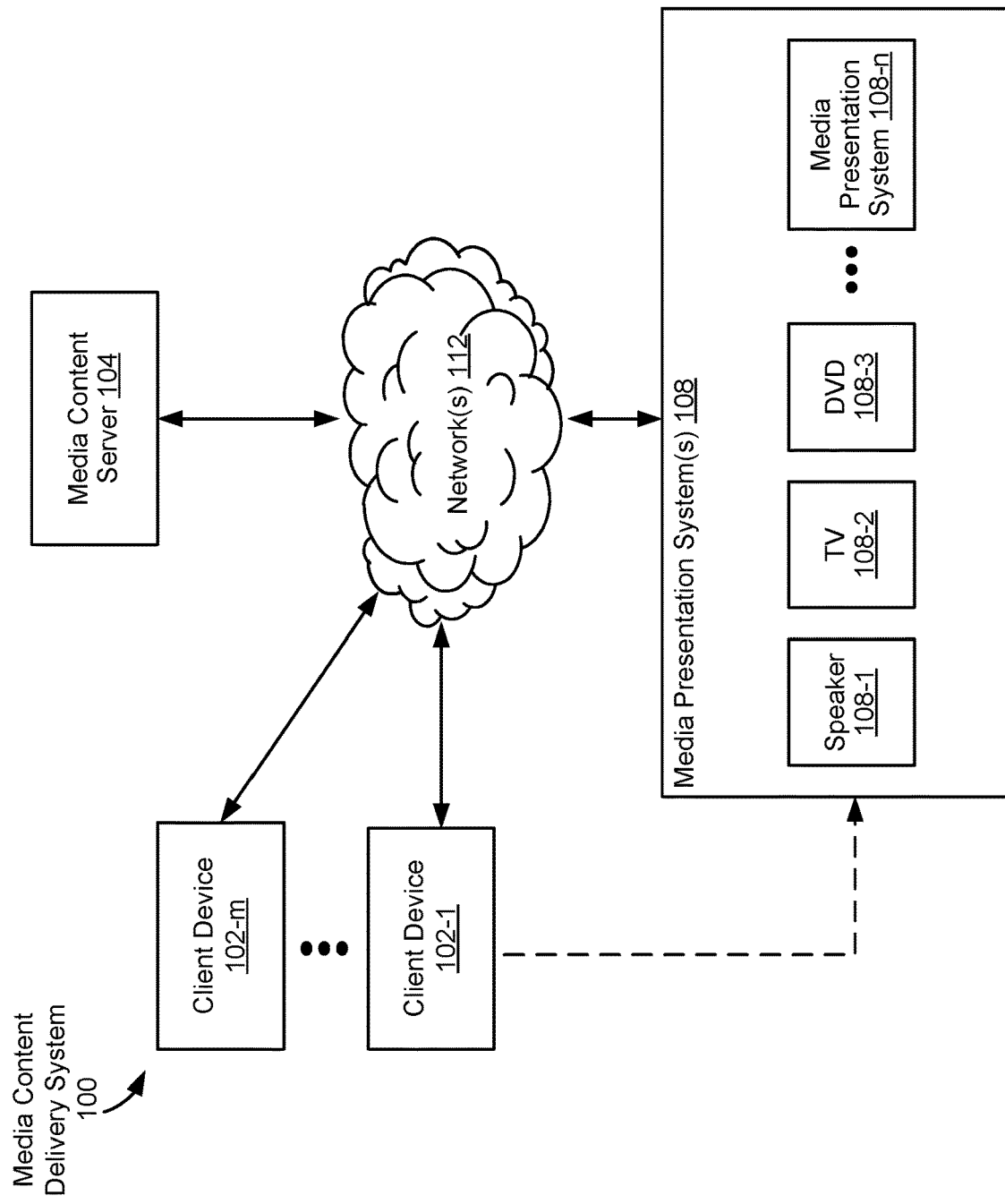
FIG. 1 is a block diagram illustrating a media content delivery system, in accordance with some embodiments.

FIG. 1 is a block diagram illustrating a media content delivery system 100, in accordance with some embodiments. The media content delivery system 100 includes one or more client devices 102 (e.g., client device 102-1 to client device 102-m, where m is an integer greater than one), one or more media content servers 104, and/or one or more media presentation system(s) 108, including speaker 108-1, television (TV) 108-2, digital versatile disk (DVD) player 108-3, and/or other media presentation system 108-n (where n is an integer greater than three). The one or more media content servers 104 are associated with (e.g., at least partially compose) a media-providing service. One or more networks 112 communicably couple the components of the media content delivery system 100. In some embodiments, the one or more networks 112 include public communication networks, private communication networks, or a combination of both public and private communication networks. For example, the one or more networks 112 can be any network (or combination of networks) such as the Internet, other wide area networks (WAN), local area networks (LAN), virtual private networks (VPN), metropolitan area networks (MAN), peer-to-peer networks, and/or ad-hoc connections.

In some embodiments, a client device 102 is associated with one or more users. In some embodiments, a client device 102 is a personal computer, mobile electronic device, wearable computing device, laptop computer, tablet computer, mobile phone, feature phone, smart phone, digital media player, or any other electronic device capable of presenting media content (e.g., controlling playback of media items, such as music tracks, videos, etc.). A client device 102 may connect to a media presentation system 108 wirelessly and/or through a wired connection (e.g., directly through an interface, such as an HDMI interface). In some embodiments, a client device 102 is a headless client. In some embodiments, client devices 102-1 and 102-m are the same type of device (e.g., client device 102-1 and client device 102-m are both mobile devices). Alternatively, client device 102-1 and client device 102-m include two or more different types of devices.

In some embodiments, client devices 102-1 and 102-m send and receive media-control information through network(s) 112. For example, client devices 102-1 and 102-m send media control requests (e.g., requests to play music, movies, videos, or other media items, or playlists thereof) to media content server 104 through network(s) 112. Additionally, client devices 102-1 and 102-m, in some embodiments, also send indications of media content items (e.g., audio track 402, FIG. 4) to media content server 104 through network(s) 112. In some embodiments, the media content items are uploaded to client devices 102-1 and 102-m before the client devices forward the media content items to media content server 104.

In some embodiments, client device 102-1 communicates directly with media presentation system(s) 108 (e.g., as illustrated by the dotted-line arrow). As illustrated in FIG. 1, client device 102-1 is able to communicate directly (e.g., through a wired connection and/or through a short-range wireless signal, such as those associated with personal-area-network (e.g., BLUETOOTH/BLE) communication technologies, radio-frequency-based near-field communication technologies, infrared communication technologies, etc.) with media presentation system(s) 108, while client device 102-m communicates with the media presentation system(s) 108 through network(s) 112. In some embodiments, client device 102-1 uses the direct connection with media presentation system(s) 108 to stream content (e.g., data for media items) for playback on the media presentation system(s) 108.

In some embodiments, client device 102-1 and/or client device 102-m include a media application 222 (FIG. 2) that allows a respective user of the respective client device to upload (e.g., to media content server 104), browse, request (e.g., for playback at the client device 102 and/or a media presentation system 108), and/or present media content (e.g., control playback of music tracks, videos, etc.). In some embodiments, one or more media content items are stored locally by a client device 102 (e.g., in memory 212 of the client device 102, FIG. 2). In some embodiments, one or more media content items are received by a client device 102 in a data stream (e.g., from the media content server 104). The media presentation system 108 may be part of the client device 102, such as built-in speakers and/or a screen, or may be separate from the client device 102, such as a wirelessly coupled speaker (e.g., speaker 108-1).

In some embodiments, the media content server 104 stores and provides media content (e.g., media content requested by the media application 222 of client device 102) to client device 102 and/or media presentation system(s) 108 via the network(s) 112. Content (also referred to herein as "media items," "media content items," and "content items") is received, stored, and/or served by the media content server 104. In some embodiments, content includes audio (e.g., music, spoken word, podcasts, etc.), video (e.g., short-form videos, music videos, television shows, movies, clips, previews, etc.), text (e.g., articles, blog posts, emails, etc.), image data (e.g., image files, photographs, drawings, renderings, etc.), games (e.g., 2- or 3-dimensional graphics-based computer games, etc.), or any combination of content types (e.g., web pages that include any combination of the foregoing types of content or other content not explicitly listed). In some embodiments, content includes one or more audio media items (also referred to herein as "audio items," "tracks," and/or "audio tracks"). In some embodiments, content server 104 stores one or more playlists (e.g., information indicating a set of media content items). For example, a playlist is a set of media content items defined by a user and/or defined by an editor associated with a media-providing service. The description of the media content server 104 as a "server" is intended as a functional description of the devices, systems, processor cores, and/or other components that provide the functionality attributed to the media content server 104. It will be understood that the media content server 104 may be a single server computer, or may be multiple server computers. Moreover, the media content server 104 may be coupled to other servers and/or server systems, or other devices, such as other client devices, databases, content delivery networks (e.g., peer-to-peer networks), network caches, and the like. In some embodiments, the media content server 104 is implemented by multiple computing devices working together to perform the actions of a server system (e.g., cloud computing).

As described above, media presentation system(s) 108 (e.g., speaker 108-1, TV 108-2, DVD 108-3, media presentation system 108-n) are capable of receiving media content (e.g., from the media content server 104) and presenting the received media content. For example, speaker 108-1 may be a component of a network-connected audio/video system (e.g., a home entertainment system, a radio/alarm clock with a digital display, or an infotainment system of a vehicle). In some embodiments, the media content server 104 sends media content to the media presentation system(s) 108. For example, media presentation system(s) 108 include computers, dedicated media players, network-connected stereo and/or speaker systems, network-connected vehicle media systems, network-connected televisions, network-connected DVD players, and universal serial bus (USB) devices used to provide a playback device with network connectivity, and the like.

Figure 2:
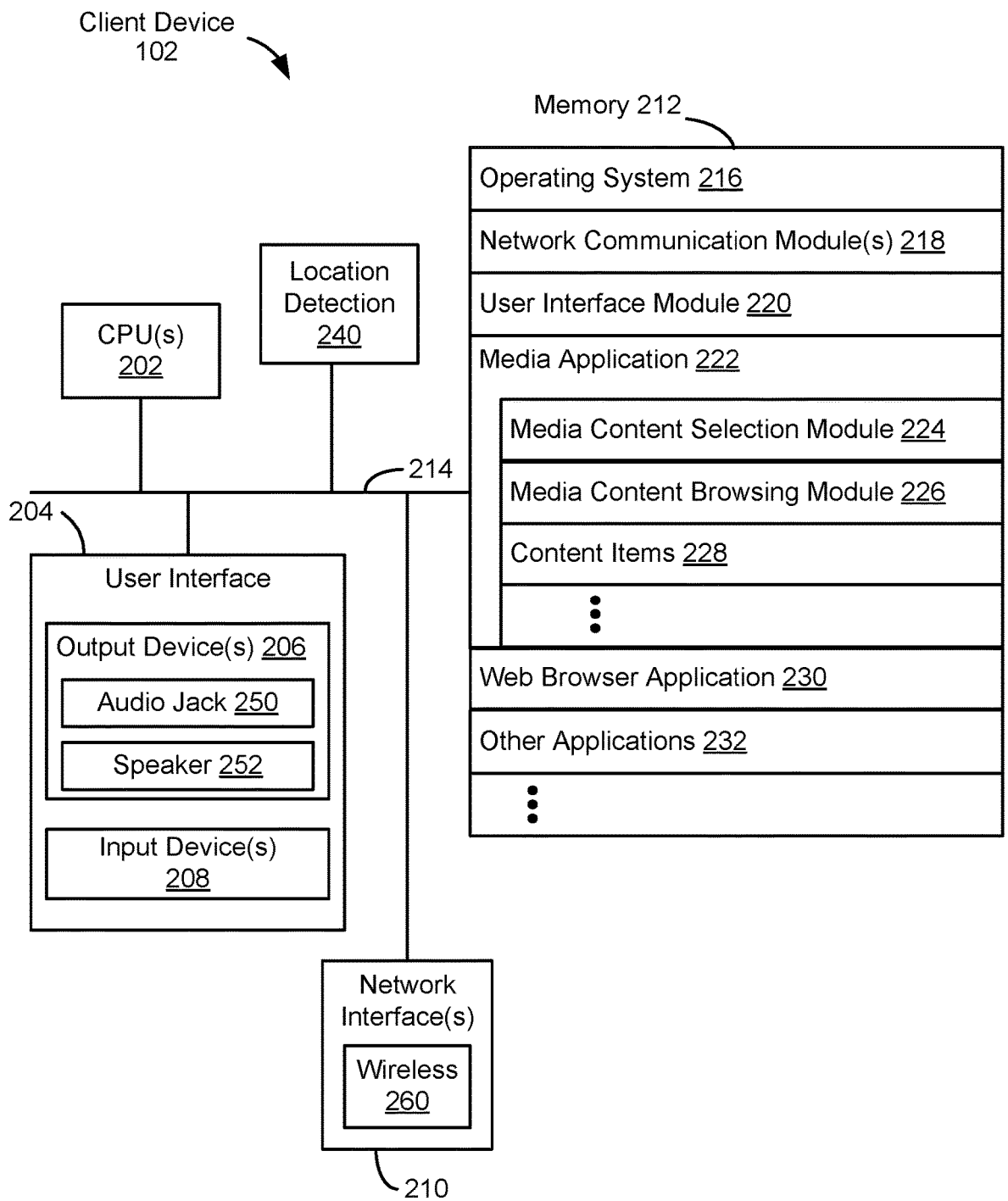
FIG. 2 is a block diagram illustrating a client device, in accordance with some embodiments.

FIG. 2 is a block diagram illustrating a client device 102 (e.g., client device 102-1 and/or client device 102-m, FIG. 1), in accordance with some embodiments. The client device 102 includes one or more central processing units (CPU(s), i.e., processors or cores) 202, one or more network (or other communications) interfaces 210, memory 212, and one or more communication buses 214 for interconnecting these components. The communication buses 214 optionally include circuitry (sometimes called a chipset) that interconnects and controls communications between system components.

In some embodiments, the client device 102 includes a user interface 204, including output device(s) 206 and/or input device(s) 208. In some embodiments, the input devices 208 include a keyboard, mouse, or track pad. Alternatively, or in addition, in some embodiments, the user interface 204 includes a display device that includes a touch-sensitive surface, in which case the display device is a touch-sensitive display. In client devices that have a touch-sensitive display, a physical keyboard is optional (e.g., a soft keyboard may be displayed when keyboard entry is needed). In some embodiments, the output devices (e.g., output device(s) 206) include a speaker 252 (e.g., speakerphone device) and/or an audio jack 250 (or other physical output connection port) for connecting to speakers, earphones, headphones, or other external listening devices. Furthermore, some client devices 102 use a microphone and voice recognition device to supplement or replace the keyboard. Optionally, the client device 102 includes an audio input device (e.g., a microphone) to capture audio (e.g., speech from a user).

Optionally, the client device 102 includes a location-detection device 240, such as a global navigation satellite system (GNSS) (e.g., GPS (global positioning system), GLONASS, Galileo, BeiDou) or other geo-location receiver, and/or location-detection software for determining the location of the client device 102 (e.g., module for finding a position of the client device 102 using trilateration of measured signal strengths for nearby devices).

In some embodiments, the one or more network interfaces 210 include wireless and/or wired interfaces for receiving data from and/or transmitting data to other client devices 102, media presentations systems 108, a media content server 104, and/or other devices or systems. In some embodiments, data communications are carried out using any of a variety of custom or standard wireless protocols (e.g., NFC, RFID, IEEE 802.15.4, Wi-Fi, ZigBee, 6LoW-PAN, Thread, Z-Wave, Bluetooth, ISA100.11a, WirelessHART, MiWi, etc.). Furthermore, in some embodiments, data communications are carried out using any of a variety of custom or standard wired protocols (e.g., USB, Firewire, Ethernet, etc.). For example, the one or more network interfaces 210 include a wireless interface 260 for enabling wireless data communications with other client devices 102, media presentations systems 108, and/or or other wireless (e.g., Bluetooth-compatible) devices (e.g., for streaming audio data to the media presentations system 108 of an automobile). Furthermore, in some embodiments, the wireless interface 260 (or a different communications interface of the one or more network interfaces 210) enables data communications with other WLAN-compatible devices (e.g., a media presentations system 108) and/or the media content server 104 (via the one or more network(s) 112, FIG. 1).

In some embodiments, client device 102 includes one or more sensors including, but not limited to, accelerometers, gyroscopes, compasses, magnetometer, light sensors, near field communication transceivers, barometers, humidity sensors, temperature sensors, proximity sensors, range finders, and/or other sensors/devices for sensing and measuring various environmental conditions.

Memory 212 includes high-speed random-access memory, such as DRAM, SRAM, DDR RAM, or other random-access solid-state memory devices; and may include non-volatile memory, such as one or more magnetic disk storage devices, optical disk storage devices, flash memory devices, or other non-volatile solid-state storage devices. Memory 212 may optionally include one or more storage devices remotely located from the CPU(s) 202. Memory 212, or alternately, the non-volatile memory solid-state storage devices within memory 212, includes a non-transitory computer-readable storage medium. In some embodiments, memory 212 or the non-transitory computer-readable storage medium of memory 212 stores the following programs, modules, and data structures, or a subset or superset thereof:

- an operating system 216 that includes procedures for handling various basic system services and for performing hardware-dependent tasks;
- network communication module(s) 218 for connecting the client device 102 to other computing devices (e.g., media presentation system(s) 108, media content server 104, and/or other client devices) via the one or more network interface(s) 210 (wired or wireless) connected to one or more network(s) 112;
- a user interface module 220 that receives commands and/or inputs from a user via the user interface 204 (e.g., from the input devices 208) and provides outputs for playback and/or display on the user interface 204 (e.g., the output devices 206);
- a media application 222 (e.g., an application for accessing a media-providing service of a media content provider associated with media content server 104) for uploading, browsing, receiving, processing, presenting, and/or requesting playback of media (e.g., media items). In some embodiments, media application 222 includes a media player, a streaming media application, and/or any other appropriate application or component of an application. In some embodiments, media application 222 is used to monitor, store, and/or transmit (e.g., to media content server 104) data associated with user behavior. In some embodiments, media application 222 includes a content-personalization module (e.g., analogous to the content personalization module 324, FIG. 3) and also includes the following modules (or sets of instructions), or a subset or superset thereof:
  - a media content selection module 224 for selecting one or more media content items and/or sending, to the media content server, an indication of the selected media content item(s);
  - a media content browsing module 226 for providing controls and/or user interfaces enabling a user to navigate, select for playback, and otherwise control or interact with media content, whether the media content is stored or played locally or remotely;
  - a content items module 228 for processing uploaded media items and storing media items for playback and/or for forwarding to the media content server;
- a web browser application 230 (e.g., Internet Explorer or Edge by Microsoft, Firefox by Mozilla, Safari by Apple, or Chrome by Google) for accessing, viewing, and interacting with web sites; and
- other applications 232, such as applications for word processing, calendaring, mapping, weather, stocks, time keeping, virtual digital assistant, presenting, number crunching (spreadsheets), drawing, instant messaging, e-mail, telephony, video conferencing, photo management, video management, a digital music player, a digital video player, 2D gaming, 3D (e.g., virtual reality) gaming, electronic book reader, and/or workout support.

In some embodiments, the media presentation system 108 is a type of client device 102, and includes some or all of the same components, modules, and sub-modules as described above in FIG. 2 with respect to the client device 102.

Figure 3:
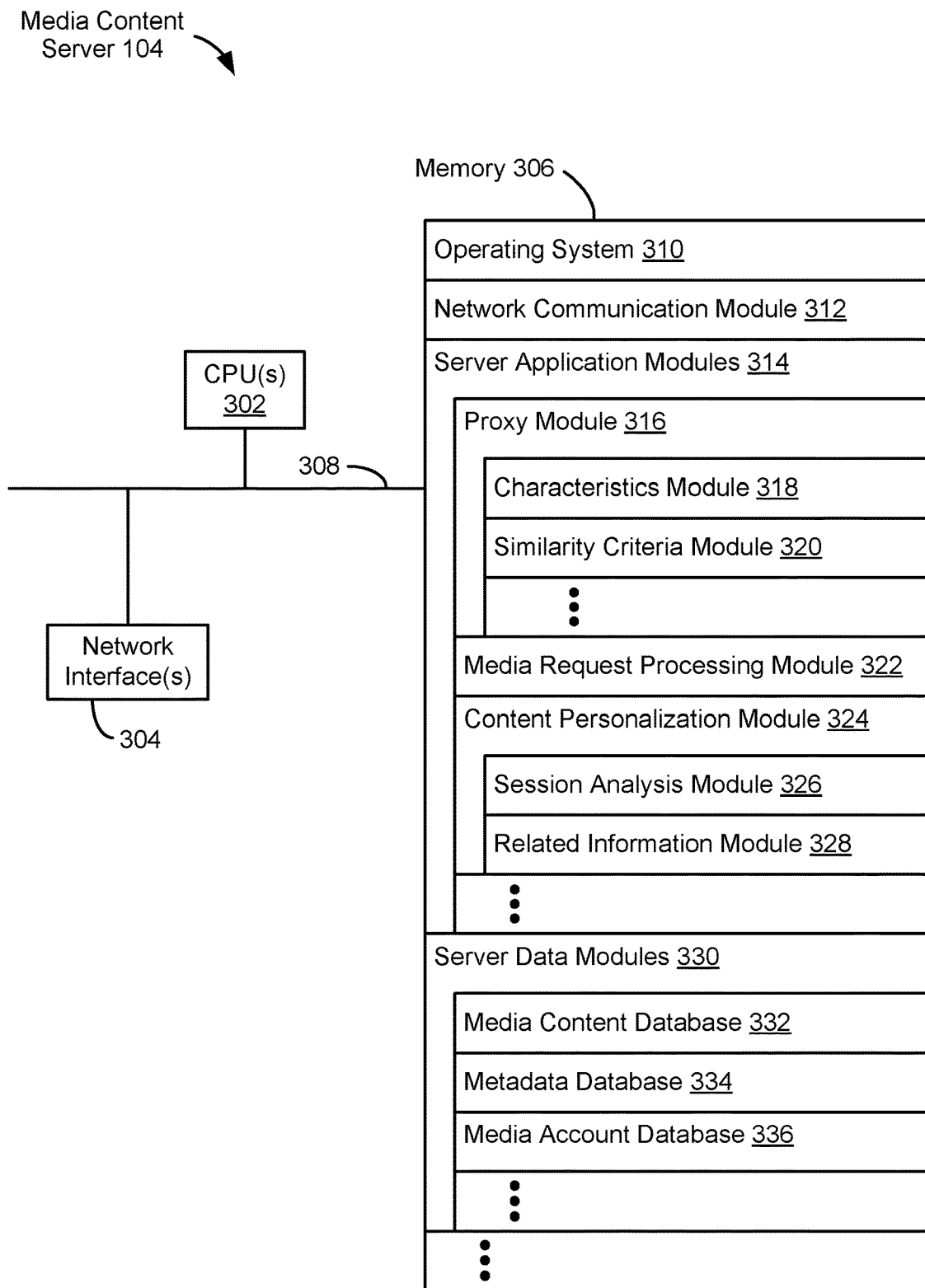
FIG. 3 is a block diagram illustrating a media content server, in accordance with some embodiments.

FIG. 3 is a block diagram illustrating a media content server 104, in accordance with some embodiments. The media content server 104 typically includes one or more central processing units/cores (CPUs) 302, one or more network interfaces 304, memory 306, and one or more communication buses 308 for interconnecting these components.

Memory 306 includes high-speed random access memory, such as DRAM, SRAM, DDR RAM, or other random access solid-state memory devices; and may include non-volatile memory, such as one or more magnetic disk storage devices, optical disk storage devices, flash memory devices, or other non-volatile solid-state storage devices. Memory 306 optionally includes one or more storage devices remotely located from one or more CPUs 302. Memory 306, or, alternatively, the non-volatile solid-state memory device(s) within memory 306, includes a non-transitory computer-readable storage medium. In some embodiments, memory 306, or the non-transitory computer-readable storage medium of memory 306, stores the following programs, modules and data structures, or a subset or superset thereof:

- an operating system 310 that includes procedures for handling various basic system services and for performing hardware-dependent tasks;
- a network communication module 312 that is used for connecting the media content server 104 to other computing devices via one or more network interfaces 304 (wired or wireless) connected to one or more networks 112;
- one or more server application modules 314 for performing various functions with respect to providing and managing a content service, the server application modules 314 including, but not limited to, one or more of:
  - a proxy module 316 for identifying one or more proxy media content items associated with a respective content item, the proxy module 316 including, but not limited to, one or more of:
    - a characteristics module 318 for determining and/or storing characteristics (e.g., represented as an acoustic vector) used to identify one or more proxy media content items; and
    - a similarity criteria module 320 for determining and/or storing similarity criteria to compare the identified one or more proxy media content items with the respective content item using similarity criteria (e.g., a shortest vector distance in vector space); and
  - a media request processing module 322 for processing requests for media content and facilitating access to requested media items by client devices (e.g., the client device 102) including, optionally, streaming media content to such devices and/or to one or more media presentation system(s) 108;
  - a content personalization module 324 for providing personalized content (e.g., playlists, tracks, advertisements, tooltips, notifications, etc.) to users of the content service, including, but not limited to, one or more of:
  a session analysis module 326 for processing and storing data relating to listening sessions (e.g., a period of time over which a user engages with the media-providing service), including identifying media content items and/or proxy media content items that are provided during listening sessions; and
  a related information module 328 for processing (e.g., identifying and/or storing) metadata related to one or more media content items, selecting metadata, and/or providing metadata to a user;
one or more server data module(s) 330 for handling the storage of and/or access to media items and/or metadata relating to the media items; in some embodiments, the one or more server data module(s) 330 include:
  a media content database 332 for storing media items;
  a metadata database 334 for storing metadata relating to the media items; and
  a media account database 336 for storing account information for user media accounts, such as user profiles, credentials (e.g., user identifiers, passwords, email addresses, etc.), and/or identifiers of any linked accounts.

In some embodiments, the media content server 104 includes web or Hypertext Transfer Protocol (HTTP) servers, File Transfer Protocol (FTP) servers, as well as web pages and applications implemented using Common Gateway Interface (CGI) script, PHP Hyper-text Preprocessor (PHP), Active Server Pages (ASP), Hyper Text Markup Language (HTML), Extensible Markup Language (XML), Java, JavaScript, Asynchronous JavaScript and XML (AJAX), XHP, Javelin, Wireless Universal Resource File (WURFL), and the like.

Each of the above identified modules stored in memory 212 and 306 corresponds to a set of instructions for performing a function described herein. The above identified modules or programs (i.e., sets of instructions) need not be implemented as separate software programs, procedures, or modules, and thus various subsets of these modules may be combined or otherwise re-arranged in various embodiments. In some embodiments, memory 212 and 306 optionally store a subset or superset of the respective modules and data structures identified above. Furthermore, memory 212 and 306 optionally store additional modules and data structures not described above.

Although FIG. 3 illustrates the media content server 104 in accordance with some embodiments, FIG. 3 is intended more as a functional description of the various features that may be present in one or more media content servers than as a structural schematic of the embodiments described herein. In practice, and as recognized by those of ordinary skill in the art, items shown separately could be combined and some items could be separated. For example, some items shown separately in FIG. 3 could be implemented on single servers and single items could be implemented by one or more servers. In some embodiments, media content database 332 and/or metadata database 334 are stored on devices that are accessed by media content server 104. The actual number of servers used to implement the media content server 104, and how features are allocated among them, will vary from one implementation to another and, optionally, depends in part on the amount of data traffic that the server system handles during peak usage periods as well as during average usage periods.

Figure 4:
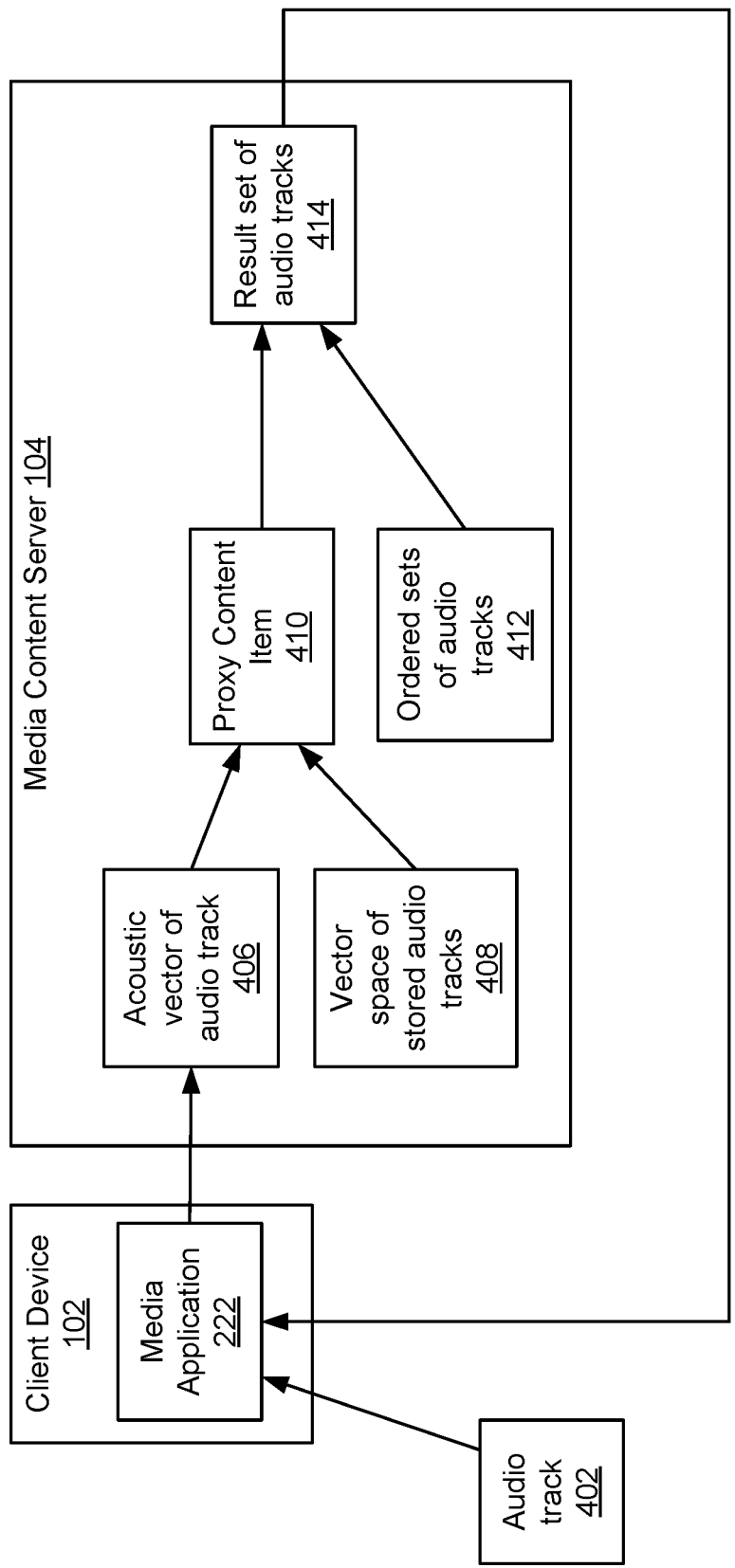
FIG. 4 is a flow diagram illustrating a method of generating a result set of content items, in accordance with some embodiments.

FIG. 4 illustrates a flow diagram of a method for generating a result set of media content items, in accordance with some embodiments. As shown in FIG. 4, a media content item (e.g., audio track 402) is provided (e.g., uploaded) to media application 222 that is running at a client device 102. In some embodiments, media application 222 is an application (such as Spotify Direct) that enables users to provide content to a media content provider. In some embodiments, media application 222 is an application (such as the Spotify application) that provides access to content from a media-providing service of a media content provider (e.g., in addition to providing users with the ability to provide content to the media content provider). In some embodiments, audio track 402 has not previously been stored by the media-providing service, has not been provided to users of the media-providing service, and/or has been infrequently been provided to users of the media-providing service (e.g., has been provided to users of the media-providing service fewer than a threshold number of times). Typically, there is limited or no listener data available for assessment of audio track 402 that would be usable for providing information about music that is similar to audio track 402.

Media content server 104 associated with the media-providing service receives audio track 402 via media application 222. For example, media application 222 transmits the audio track 402 from client device 102 to the media content server 104. Media content server 104 stores and/or accesses audio tracks of a media content library (e.g., media stored by media content database 332) in order to provide media content to users of a media-providing service. To enable determining audio tracks that are related to other audio tracks in the media content library (e.g., for the purpose of recommending content to users), media content server 104 stores and/or accesses a vector space 408 of stored audio tracks (e.g., including vectors that correspond to at least a portion of the media stored by media content database 332). In some embodiments, the stored vector space 408 of audio tracks is generated at the media content server 104. For example, the media content server 104, for all (or a portion of) audio tracks stored by the media content provider, determines an acoustic vector to represent each audio track and stores (e.g., in a database, such as media content database 332 or metadata database 334) the acoustic vectors.

Media content server 104 generates an acoustic vector 406 for received audio track 402. In order to determine audio tracks from the media content already stored by the media-providing service that are similar to audio track 402, media content server 104 determines a proxy media content item 410. Proxy media content item 410 is a content item selected from a media content library that is similar to a new audio track 402 just received by media content server 104. For example, proxy media content item 410 is selected by comparing an acoustic vector 406 of the audio track 402 with at least a portion of the vectors of vector space 408 of previously stored audio tracks. In some embodiments, more than one proxy media content item is identified (e.g., different proxy media content items are identified using different portions of the vector space 408 of stored audio tracks).

Media content server 104 stores information associated with ordered sets 412 of audio tracks. Ordered sets 412 of audio tracks correspond to media content in playlists, media content provided by the media-providing service to one or more users during a time period (e.g., a time window of 1 hour, 1 day, 2 weeks, etc.), and/or media content provided by the media-providing service to one or more users during user listening sessions (e.g., identified from information about listening histories of the users). For example, a user listening session is a period of time during which a user is continually or substantially continually provided with content by the media-providing service. In some embodiments, user listening sessions vary in length (e.g., depending on how long a user is continually or substantially continually consuming content).

In some embodiments, media content server 104 compares the ordered sets 412 of audio tracks with proxy media content item 410. For example, media content server 104 determines, for the collection of the ordered sets 412 of songs, a subset of ordered sets 412 of audio tracks that include the proxy media content item 410. In this way, media content server 104 uses proxy media content item 410 to determine content items from the ordered sets 412 that is similar to audio track 402. For example, the media content server 104 identifies playlists that include the proxy media content item 410 and/or user listening sessions during which a user consumed the proxy media content item 410. In some embodiments, the ordered sets of audio tracks represent listening sessions or playlists for a plurality (e.g., all) users of the media-providing service.

After identifying the subset of the ordered sets of audio tracks that include (and/or are related to) the proxy media content item 410, the media content server 104 provides a result set 414 of audio tracks that are related to the proxy media content item 410. For example, the result set 414 of audio tracks provides an indication of audio tracks that are most likely to be played in the same context as the context in which the proxy media content item 410 is played. In some embodiments, the result set 414 of audio tracks includes audio tracks that were played, by one or more users, temporally close to (e.g., immediately before or after, or within a threshold amount of time and/or threshold number of audio tracks) the proxy media content item 410 during a user listening session or in a playlist. In some embodiments, the result set 414 of audio tracks includes audio tracks that appear, for multiple users, within the same listening session and/or playlist, indicating that users who listen to the proxy media content item also prefer listen to one or more audio tracks included in the result set 414 of audio tracks.

The result set 414 of audio tracks is returned to client device 102 (e.g., for display by media application 222). In some embodiments, the result set 414 of audio tracks includes information related to one or more audio tracks of the result set 414 of audio tracks, such as artist information, identifying information (e.g., stored track ID information), region identifier (e.g., country), and/or language. In some embodiments, the result set 414 of audio tracks includes a list of audio tracks that are related to the proxy audio track 410. For example, the result set 414 of audio tracks includes a playlist (or other list) that is curated to include audio tracks of the result set 414. In this way, the media application 222 provides the user of client device 102 with information that is usable for promotion, targeting, and/or collaboration, such as information about groups of users that will be likely to consume the provided audio track 402 and/or artists that create tracks that are appealing to a similar audience.

In some embodiments, the result set 414 of audio tracks includes the audio track 402 that was submitted to media application 222 associated with the media providing service (for example, in the case that audio track 402 is a media item that has previously been stored by the media content provider).

Figure 5B:
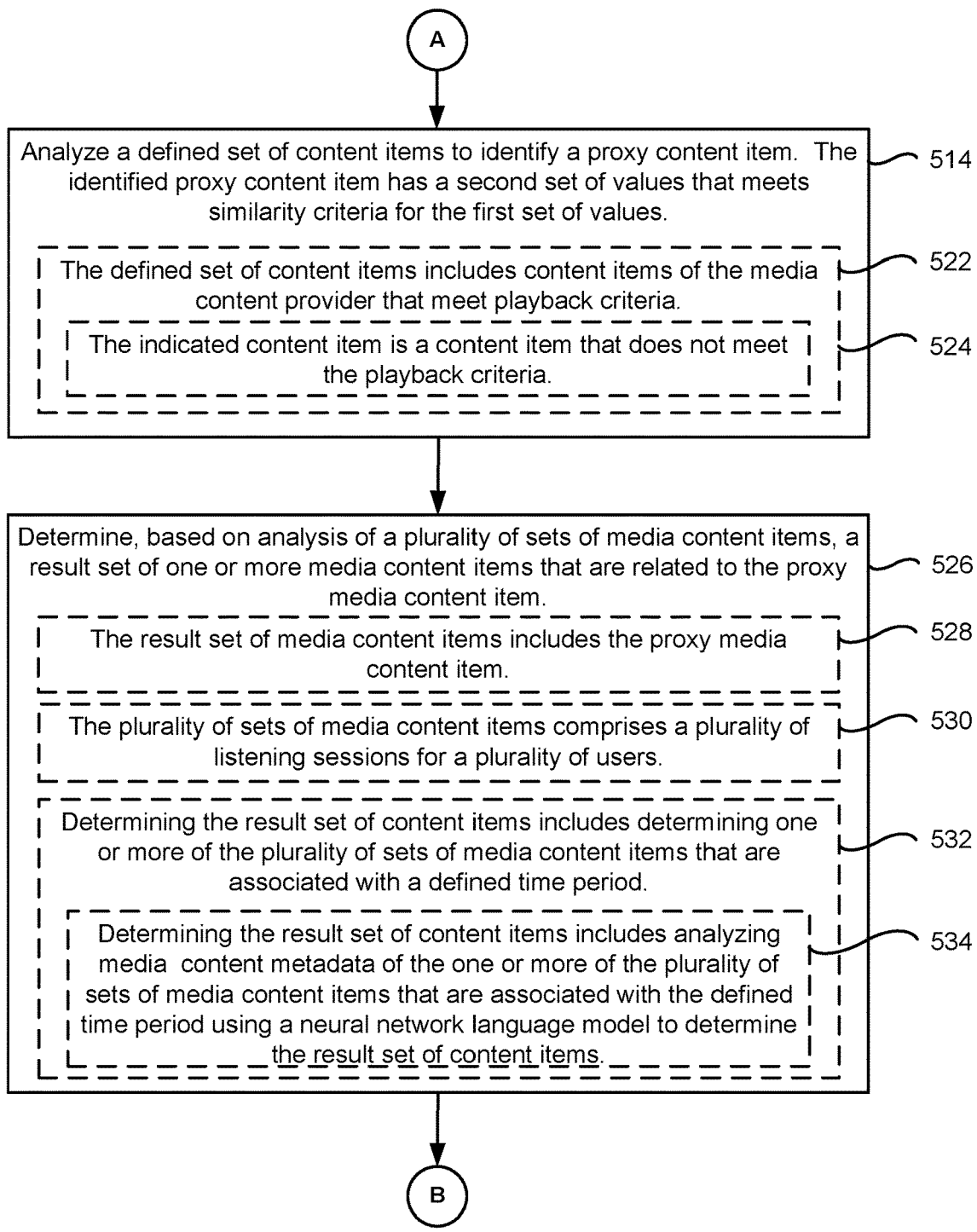
Figure 5C:
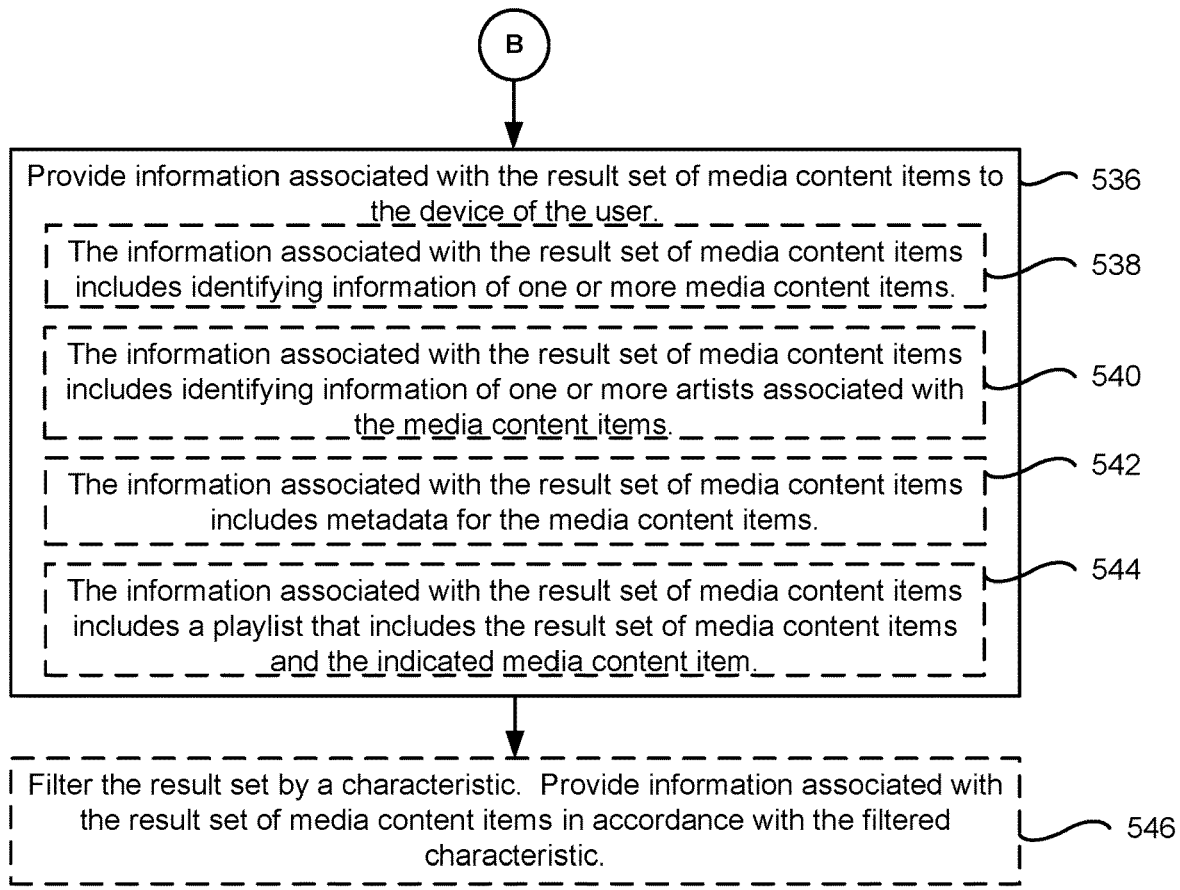

FIGS. 5A-5C are flow diagrams illustrating a method 500 for providing information associated with a result set of media content items, in accordance with some embodiments. Method 500 may be performed (502) at a server system of a media-providing service (e.g., media content server 104, FIGS. 1 and 3), the server system having one or more processors and memory storing instructions for execution by the one or more processors. In some embodiments, the method 500 is performed by executing instructions stored in the memory (e.g., memory 306, FIG. 3) of the server system. In some embodiments, the method 500 is performed by a combination of the server system and a client device. In some embodiments, the server system provides tracks (e.g., media items) for playback to client devices 102 and/or media presentation system(s) 108 of the media content delivery system 100.

Referring now to FIG. 5A, in performing the method 500, the server system receives (504) an indication of a media content item (or an indication of a set of media content items) from a device (e.g., a client device 102) of a user of a media content provider. For example, the indication of the media content item is an uploaded media content item and/or an identifier of a media content item. In some embodiments, the media content item is stored on client device 102, stored on a device that is remote from client device 102 (e.g., media presentation system 108), or stored by the media content provider (e.g., by media content server 104).

In some embodiments, the indicated content item is (506) a content item that has not been previously provided to the media content provider (e.g., the content item is not stored by media content server 104). In some embodiments, the indicated content item has not been transmitted by the media content provider to one or more users of the media-providing service of the media content provider. In some embodiments, the indicated content item has been previously provided to and/or stored by the media content provider (e.g., by media content server 104). In some embodiments, the indication of the content item does not include the media content of the content item (e.g., the indication comprises a title, artist, or other information identifying a content item). In some embodiments, the indicated content item does not satisfy popularity criteria. For example, the popularity criteria include criteria that are satisfied in accordance with a determination that a total number of times that the indicated content item has been streamed to users is above a threshold number of times, a total number of users that have requested the audio track for playback is above a threshold number of users, and/or a user-input average rating of the audio track is above a threshold rating.

In some embodiments, receiving the indication of the media content item includes (508) receiving the media content item. In some embodiments, the content item includes audio and/or video content. For example, the server system receives an audio track (e.g., audio track 402) from client device 102, as described above with reference to FIG. 4. In some embodiments, a user uploads the media content item (e.g., using media application 222) such that the server system can access the uploaded media content item. In some embodiments, the uploaded media content item is stored by media application 222. In some embodiments, the uploaded media content item is transmitted from client device 102 to media content server 104 (e.g., by media application 222). In some embodiments, the media content item is stored by media content server 104 and receiving the indication of the media content item includes receiving identifying information that identifies the stored media content item.

The server system determines (510) a first set of values (e.g., an acoustic vector 406) that correspond to characteristics of the indicated content item. For example, the first set of values represents an acoustic vector. The acoustic vector can be Y-dimensional, where Y is an integer greater than 1 (e.g., where Y is the number of characteristics of content item). The acoustic vector is defined by a plurality of characteristics that describe the indicated content item. In some embodiments, the characteristics of the indicated content item include (512) one or more characteristics selected from the group consisting of: a degree to which a track is acoustic, a strength of a beat, a degree to which a track sounds choppy, suitability for dancing, positions of a track where downbeats occur, duration of a track, average dynamic range, a measure of energy of a track, a degree to which the twelve pitches are balanced, a degree to which a track contains vocals, key, a degree to which a live audience is present, loudness, a degree of consistency of timing, fade-in point, fade-out point, modal scale, suitability for running, a degree to which a track includes spoken words, tempo, time signature, and a degree to which a track is cheerful.

The server system analyzes (514) a defined set of content items (e.g., a set or subset of content items stored by and/or associated with the media content provider) to identify a proxy media content item (or set of proxy media content items). For example, the server analyzes a defined set of audio tracks (e.g., part or all of the media content stored in media content database 332, such as ordered set of audio tracks 412) to identify a proxy item 410 as described with regard to FIG. 4. The identified proxy media content item has a second set of values that meets similarity criteria (e.g., a highest degree of matching values or a degree of correspondence above a similarity threshold) for the first set of values. For example, each content item in the defined set of content items is defined by an acoustic vector capturing the one or more characteristics described above. Analyzing the defined set of content items to identify a proxy media content item includes comparing the acoustic vectors describing the content items in the defined set of content items (e.g., vector space 408 of all audio tracks, as described with regard to FIG. 4) with the acoustic vector describing the received media content item.

In some embodiments, the similarity criteria include (516) criteria that are met in accordance with a determination that the second set of values has a closest vector distance in vector space to the first set of values. For example, the analysis includes determining which media content item, of the defined set of content items, has an acoustic vector that is closest in vector space to the acoustic vector describing the received media content item.

In some embodiments, the indicated content item is (518) distinct from the defined set of content items. For example, the defined set of content items does not include the indicated content item received by the server system.

In some embodiments, the defined set of content items includes (520) one or more playlists (e.g., a stored set of media content items defined by a user or by an editor associated with the media content provider).

In some embodiments, the defined set of content items includes (522) content items of the media content provider that meet playback criteria (e.g., popularity criteria). For example, the defined set of content items includes content items that have been streamed to users for playback by more than a threshold number of times and/or are considered "popular." In some embodiments, the defined set of content items is a subset (e.g., less than all) of the content items stored by or otherwise associated with the media content provider. In some embodiments, the defined set of content items is a filtered set of content items (e.g., to filter out particular regions, markets, and/or features describing the content items). In some embodiments, the indicated content item is (524) a content item that does not meet the playback criteria.

The server system determines (526), based on analysis of a plurality of sets of media content items (e.g., a plurality of user listening sessions), a result set (e.g., a list) of one or more media content items that are related to the proxy media content item. For example, as described with regard to FIG. 4, the result set 414 of audio tracks is determined based on comparing the ordered sets 412 of audio tracks with the proxy media content item 410.

In some embodiments, the result set of media content items includes (528) the proxy media content item.

In some embodiments, the plurality of sets of media content items comprises (530) a plurality of listening sessions for a plurality of users. For example, the listening sessions for a user includes a listening history of a user over a predefined amount of time (e.g., the past 28 days). In some embodiments, the plurality of sets of media content items include a plurality of listening sessions for each of a plurality of users (e.g., multiple listening sessions for more than one user). In some embodiments, each listening session of a user corresponds to a variable time period in which the user streamed content from the media-providing service. For example, each time the user requests a media content item (e.g., for playback) is included in a listening session. Some listening sessions include a plurality of user requests (e.g., a block of time in which the user requests media content) and some listening sessions include a single media content item (e.g., the user requested to play one media content item and then stopped streaming from the media-providing service).

In some embodiments, determining the result set of content items (e.g., result set 414) includes (532) determining (e.g., from a plurality of listening sessions) one or more of the plurality of sets of media content items that are associated with a defined time period. For example, the server system determines the one or more of the plurality of sets of media content items that have been consumed by a user within a defined set of hours (e.g., the prior hour), days (e.g., the prior day, the prior 28 days), weeks (e.g., the prior week), or months (e.g., the prior month).

In some embodiments, determining the result set of content items includes (534) analyzing media content metadata of the one or more of the plurality of sets of media content items that are associated with the defined time period using a neural network language model to determine the result set of content items. For example, the server system uses a neural network (e.g., a neural network language model such as Word2Vec) and/or complex analysis to generate the result set.

The server system provides (536) information associated with the result set of media content items to the device of the user. For example, the server system provides the information to a client device of the user for display (e.g., by a user interface displayed by user interface module 22. In some embodiments, the information associated with the result set of media content items includes (538) identifying information of one or more media content items. For example, the information includes media content item names (e.g., track titles), artists of the media content items, track ids for the media content items, and/or playlists that include at least a portion of the media content items.

In some embodiments, the information associated with the result set of media content items includes (540) identifying information of one or more artists associated with the media content items. In some embodiments, the information associated with the result set of media content items includes (542) metadata for the media content items. For example, metadata includes content item title, content item length, content item artist, content item genre, content item region, and/or content item language. In some embodiments, the information associated with the result set of media content items includes (544) a playlist that includes the result set of media content items and the indicated media content item. For example, the server system generates a playlist that includes at least a portion of the result set of media content items and the received (indicated) media content item. In some embodiments, a user requests a type of information to include in the result set. For example, the user that uploaded the received media content item requests (e.g., via user input in the application associated with the media-providing service) a list of artists associated with the result set of media content items. In some embodiments, in response to the request, the requested type of information is displayed by client device 102.

In some embodiments, the server system filters (546) the result set by a characteristic and provides information associated with the result set of media content items in accordance with the filtered characteristic. For example, the server system filters the result set to include and/or exclude media content associated with one or more characteristics (e.g., types of metadata) such as region, language and/or genre. In some embodiments, the user who uploaded the received media content item can select (e.g., via user input) filters to be applied to the result set. In some embodiments, the server system provides (e.g., for display on a client device) the filtered result set to the user.

Generating a result set of media content items for transmission to a device of a user based on a determined proxy media content item reduces input required from a user (e.g., by enabling a user to provide only an indication of new media content, without the need for the user to perform additional searches and analyses of content in the media content library). Reducing the number of inputs required to generate a result set of media content items increases the efficiency of the device (e.g., by reducing the need for the user to peruse the media content library, selecting and/or listening to a series of media content items in order to determine a result set of related media content items). Increasing the efficiency with which a media-providing service generates a result set of media content items reduces the processing power required to generate such results (e.g., by reducing the amount of user interaction required).

Although FIGS. 5A-5C illustrate a number of logical stages in a particular order, stages which are not order dependent may be reordered and other stages may be combined or broken out. Some reordering or other groupings not specifically mentioned will be apparent to those of ordinary skill in the art, so the ordering and groupings presented herein are not exhaustive. Moreover, it should be recognized that the stages could be implemented in hardware, firmware, software, or any combination thereof.

Figure 6:
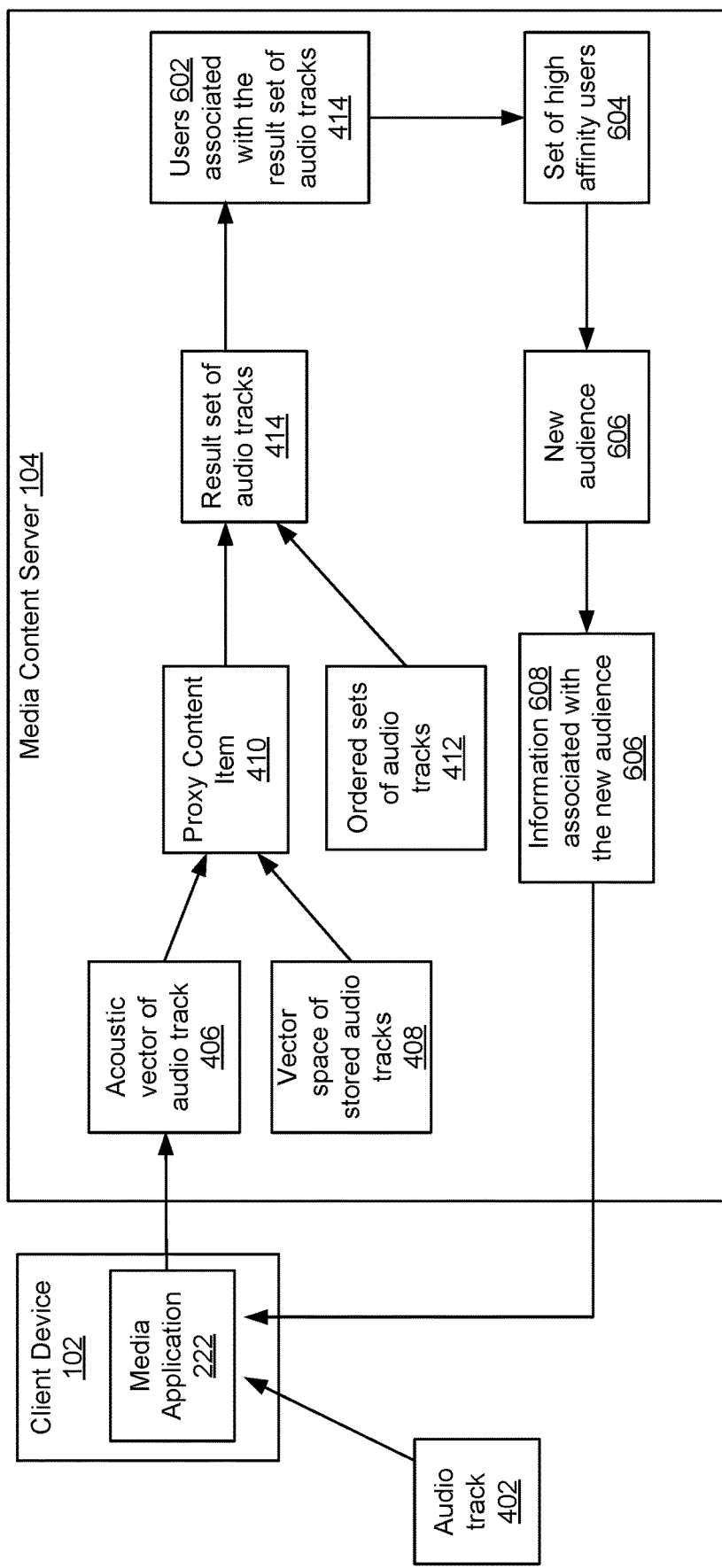
FIG. 6 is a flow diagram illustrating a method of generating a result set of users, in accordance with some embodiments.

FIG. 6 is a flow diagram illustrating a method of generating a result set of users in accordance with some embodiments. The result set 604 of users includes users of the media-content server 104 that are associated with the result set 414 of audio tracks (e.g., users that have a history of listening the audio tracks of the result set 604 of audio tracks). In some embodiments, the users of the result set 604 of users are not associated with the audio track 402 (e.g., have not listened to the audio track 402 or a creator, producer, a performer, or other person or organization associated with the audio track 402 before). In some embodiments, the result set of users represents users that have a history of listening audio tracks similar to the audio track 402 and therefore serve as a possible new audience for the audio track 402.

In FIG. 6, receiving an audio track 402, generating an acoustic vector 406, determining a proxy media content item 410, and determining a result set 414 of audio tracks proceeds as described with regard to FIG. 4.

As shown in FIG. 6, the media-content server 104 determines users 602 associated with the result set 414 of audio tracks. In some embodiments, determining the users 602 associated with the result set 414 of audio tracks 414 includes identifying users that have previously received at least one audio track included in the result set of audio tracks 414 from the media-content provider 104. In some embodiments, the users 602 include users that have received at least one audio track of the result set of audio tracks 414 in a defined time period. In some embodiments, a time period is a defined set of hours (e.g., the prior hour), days (e.g., the prior day, the prior 28 days), weeks (e.g., the prior week), or months (e.g., the prior month).

The media-content server 104 analyzes the users 602 associated with the result set 414 of audio tracks to identify a set of high affinity users 604 from the users 602. For example, the set of high affinity users 604 includes users that have a user history indicating that they are interested in (e.g., they have frequently received, requested, and/or played playlists that include) audio tracks included in the result set 414 of audio tracks. In contrast, low affinity users have a user history indicating that they are not very interested in the audio tracks included in the result set 414 of audio tracks (e.g., low affinity users have received, requested, and/or played playlists that include the audio tracks included in the results set 414 of audio tracks fewer than a threshold number of times). In some embodiments, identifying the set 604 of high affinity users includes identifying a set of low affinity users from among the users 602 and removing the set of low affinity users from users 602 to obtain the set 604 of high affinity users. In some embodiments, the set of low affinity users includes users that have not received a threshold number of audio tracks of the result set of audio tracks 414 in a defined time period. In some embodiments, the time period is the prior day, the prior week, or the prior month in order to identify high affinity users that have a user history indicating that they have recently been very interested or attracted to the audio tracks included in the result set of audio tracks. In some embodiments, the threshold number of audio tracks is two or more audio tracks (e.g., two, five, ten, twenty, or fifty audio tracks). For example, the set of low affinity users includes users that have not during the past one month time period received ten or more audio tracks of the result set of audio tracks 414 from the media-content provider 104. In some embodiments, the set of low affinity users includes users that have not performed a threshold number (e.g., two, three, four, five, ten, or twenty) of searches (e.g., searches on the media application 222 associated with media content server 104) on one or more audio tracks of the result set of audio tracks 414 in a defined time period. In some embodiments, the set of low affinity users includes users that have not created a threshold number (e.g., two, three, four, five, ten, or twenty) of playlists (e.g., playlists created on the media application 222 associated with media content server 104) including one or more audio tracks of the result set of audio tracks 414.

The media-content server 104 further reduces the set of high affinity users 604 by identifying new audience 606. The new audience 606 includes users of the set of high affinity users 604 that have not previously received any audio tracks associated with the client device 102 and/or the audio track 402. In some embodiments, the associated audio tracks are from a same content provider (e.g., an artist, performer, a band, an audio track writer, or a producer) as the audio track 402. For example, the new audience 606 includes users of the set of high affinity users 604 that have not previously received any audio tracks from a singer that performs the audio track 402. In order to identify the new audience 606, the media-content server 104 identifies a set of users that have received in the past audio tracks associated with client device 102 and/or audio track 402, and removes this set of users from the high affinity users 604. In some embodiments, the new audience 606 is identified prior to identifying the set of high affinity users 604.

The media-content provider 104 then collects information 608 associated with the new audience 606 and transmits the information 608 to the client device 102 (e.g., through media application 222). In some embodiments, the information 608 includes information provided to the media-content server 102 by the users that are in the new audience 606. For example, the information 608 includes information that a user provides when setting up a user account. In some embodiments, the information 608 includes demographic information, including, information related to one or more of gender, age, geographic location, language, profession, or user account type (e.g., a free account, or a purchased account). In some embodiments, the information 608 includes information related to user accounts, such as information about user's interactions with media content server 104, (e.g., purchase history, downloading and/or streaming history, search history, and/or playlist creation history). For example, the information related to the user accounts includes information about music genres that the new audience 606 has a history of receiving from the media content server 104. In some embodiments, the information 608 includes information that is useful for advertisement, marketing, product development, etc. For example, the information 508 is useful for identifying a geographic location for running an advertisement campaign for the audio track 402.

Figure 7B:
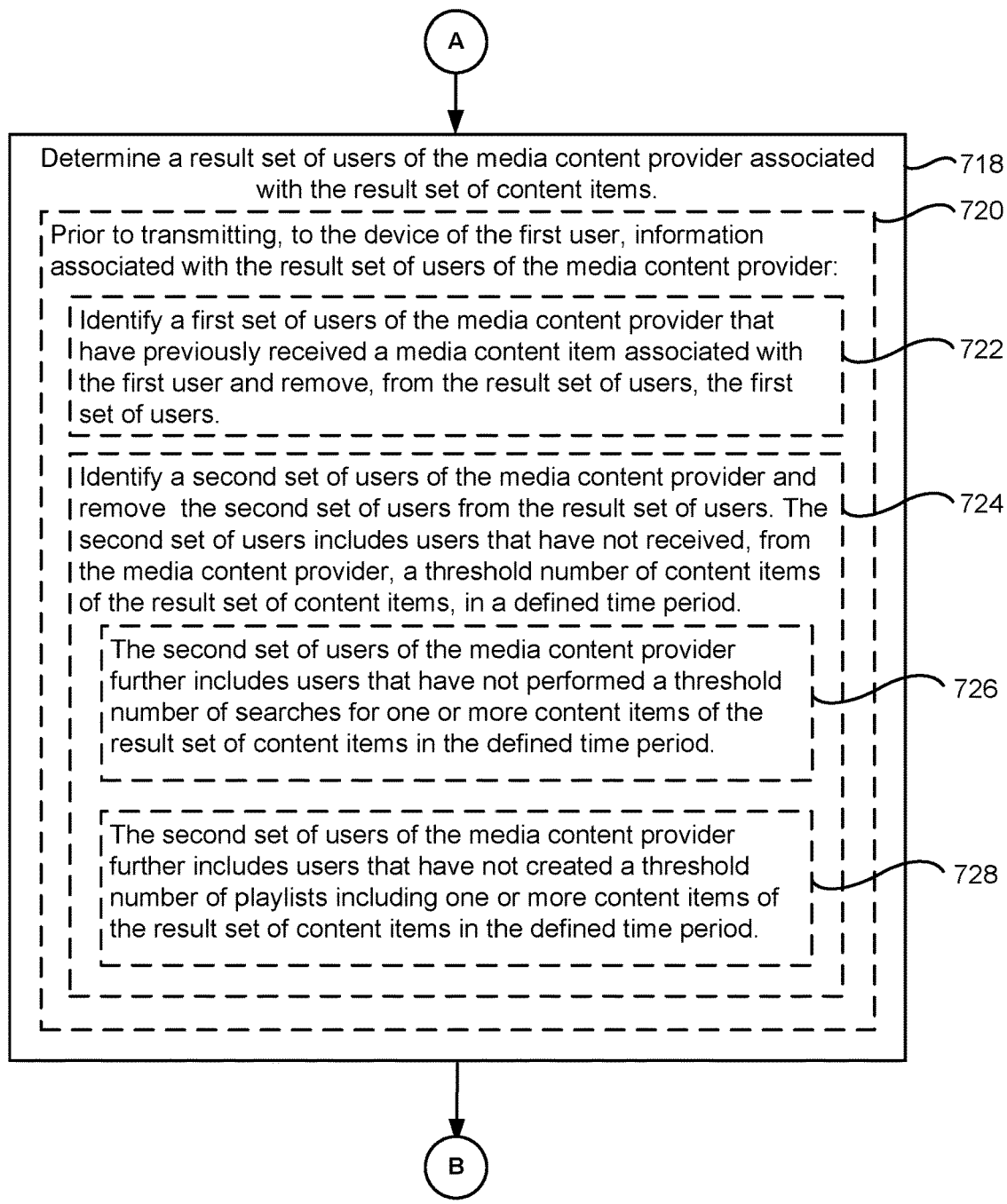
Figure 7C:
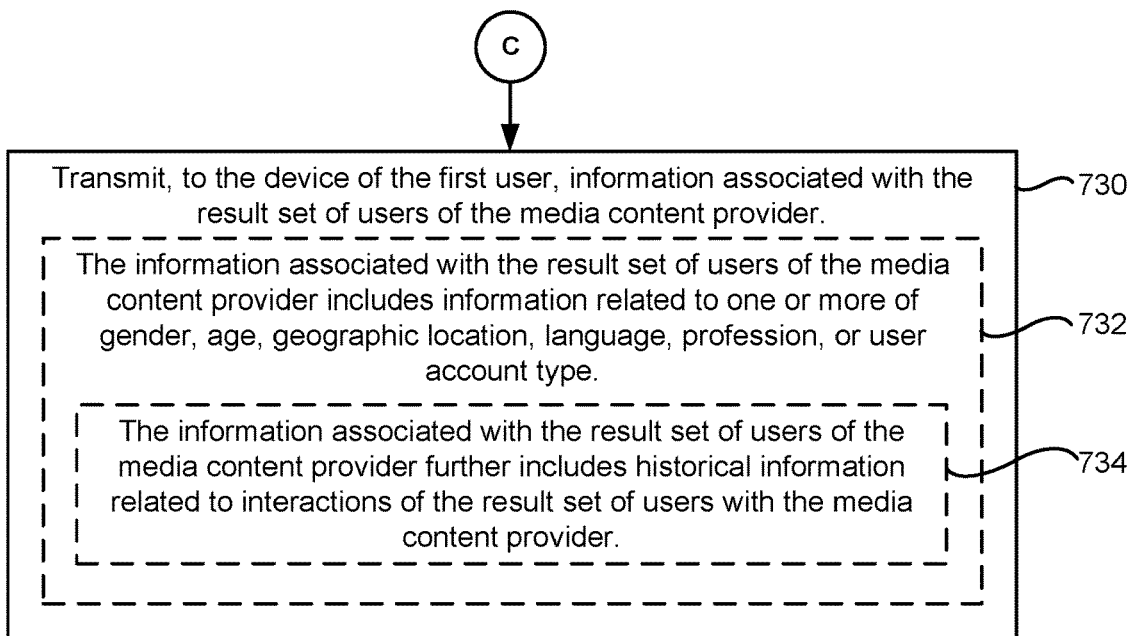

FIGS. 7A-7C are flow diagrams illustrating a method 700 for providing a result set of users in accordance with some embodiments. The method 700 may be performed (702) at a server system of a media-providing service (e.g., media content server 104, FIGS. 1 and 3), the server system having one or more processors and memory storing instructions for execution by the one or more processors. In some embodiments, the method 700 is performed by executing instructions stored in the memory (e.g., memory 306, FIG. 3) of the server system. In some embodiments, the method 700 is performed by a combination of the server system and a client device. In some embodiments, the server system provides tracks (e.g., media items) for playback to client devices 102 and/or media presentation system(s) 108 of the media content delivery system 100.

Referring now to FIG. 7A, in performing the method 700, the server system receives (704) an indication of a media content item (or an indication of a set of media content items) from a device (e.g., a client device 102) of a first user of a media content provider. For example, the server system receives (e.g., from the first user) an identifier of a media content item, such as a media content item stored on a user's device, stored on a remote device, or stored by the content provider. In some embodiments, the first user uploads the media content item (e.g., to an application running on a client device of the user) such that the server system can access the uploaded media content item. In some embodiments, the indicated media content item is a media content item that has not been previously provided to the media content provider. In some embodiments, the indicated media content item has been previously provided to the media content provider. In some embodiments, the indication of the media content item does not include the media content of the media content item (e.g., the indication comprises a title, artist, or other information identifying a media content item). In some embodiments, the first user is a creator, producer, performer (e.g., an artist, a band, etc.) or other person or organization associated with the indicated media content item.

The server system determines (706) a first set of values (e.g., an acoustic vector 406) that correspond to characteristics of the indicated media content item (e.g., as described above with regard to operations 510-512 in FIG. 5A).

The server system analyzes (708) a defined set of media content items (e.g., a set or subset of media content items stored by and/or associated with the media content provider) to identify a proxy content media item (or set of proxy media content items). For example, identifying a proxy content media item is performed as described above with regard to operations 514-524 in FIGS. 5A-5B. In some embodiments, analyzing the defined set of media content items to identify the proxy media content item includes comparing the acoustic vectors corresponding to the media content items in the defined set of media content items (e.g., vector space 408 of stored audio tracks, as described with regard to FIG. 4) with the acoustic vector corresponding to the received media content item (the acoustic vector of audio track 406) and determining a media content item (e.g., proxy media content item 410), of the defined set of media content items, that has an acoustic vector that is closest in vector space to the acoustic vector describing the audio track 402. In some embodiments, the identified proxy media content item 410 has a second set of values that meets similarity criteria for the first set of values. For example, each media content item in the defined set of media content items is defined by an acoustic vector (e.g., the vector space of all audio tracks 408, as described with regard to FIG. 4) capturing the one or more characteristics described with regard to operation 512 in FIG. 5A. In some embodiments, the second set of values of the proxy media content item 410 has a highest degree of matching values or a degree of correspondence above a similarity threshold for the first set of values (e.g., the acoustic vector of audio track 406).

In some embodiments, the indicated media content item is (710) distinct from the defined set of media content items. For example, the defined set of media content items does not include the indicated media content item received by the server system. In some embodiments, the defined set of media content items includes (712) media content items of the media content provider that meet playback criteria. For example, the defined set of media content items include media content items that have been streamed to users for playback by more than a threshold number of times. For example, the defined set of media content items is a subset, less than all, of the media content items stored by or otherwise associated with the media content provider. In some embodiments, the similarity criteria include (714) criteria that are met in accordance with a determination that the second set of values (e.g., the acoustic vector of the proxy media content item 410) has a closest vector distance in vector space to the first set of values (e.g., the acoustic vector of audio track 406).

The server system generates (716), from the defined set of media content items, a result set of media content items (e.g., as described above with regard to operations 526-534 in FIG. 5B). The result set of media content items includes media content items that are associated with the proxy media content item. For example, the generating includes determining media content items from a plurality of sets of media content items (e.g., from listening sessions that correspond to the identified proxy media content item) that are associated with the proxy media content item.

Referring now to FIG. 7B, the server system determines (718) a result set of users of the media content provider associated with the result set of media content items. For example, as described with regard to FIG. 6, the media content server 104 determines, from among all users of the media content provider 104, the users 602 associated with the result set of audio tracks 414. In some embodiments, users 602 include users that have previously received at least one audio track included in the result set of audio tracks 414 from the media-content provider 104.

In some embodiments, prior to transmitting (720), to the device of the first user, information associated with the result set of users of the media content provider, the server system identifies (722) a first set of users of the media content provider that have previously received a media content item associated with the first user and remove, from the result set of users, the first set of users. In some embodiments, the associated audio tracks are from a same content provider (a creator, producer, performer, or other person or organization) as the audio track 402. In some embodiments, the first set of users have previously received, from the media content provider, a media content item or a threshold number of media content items associated with (e.g., recorded by, produced by, authored by, and/or featuring) the first user of the media content provider. For example, as described with regard to FIG. 6, the media content server 104 identifies a set of users that have received in the past audio tracks associated with client device 102 and/or audio track 402, and removes this set of users from the result set of users to identify the new audience 606.

In some embodiments, prior to transmitting (720) to the device of the first user, information associated with the result set of users of the media content provider, the server system identifies (724) a second set of users of the media content provider and removes the second set of users from the result set of users. The second set of users includes users that have not received, from the media content provider, a threshold number of media content items (e.g., two, five, ten, twenty, or fifty media content items) of the result set of media content items, in a defined time period. For example, as described with regard to FIG. 6, the media content server 104 identifies the set of high affinity users 604 from the users 602 by identifying a set of low affinity users from among the users 602 and removing the set of low affinity users from users 602.

In some embodiments, the second set of users of the media content provider includes (726) users that have not performed a threshold number of searches for one or more media content items of the result set of media content items in the defined time period (e.g., two, three, four, five, ten, or twenty searches). In some embodiments, the second set of users of the media content provider further includes (728) users that have not created a threshold number of playlists (e.g., two, three, four, five, ten, or twenty playlists) including one or more media content items of the result set of media content items in the defined time period. In some embodiments, the time period is a defined set of hours (e.g., the prior hour), days (e.g., the prior day, the prior 28 days), weeks (e.g., the prior week), or months (e.g., the prior month).

Referring now to FIG. 7C, the server system transmits (730), to the device of the first user, the information associated with the result set of users of the media content provider. For example, as described with regard to FIG. 6, the media content server 104 transmits the information 608 associated with the new audience 606 to the client device 102. In some embodiments, the media content server 104 displays the information 608 on the client device 102.

In some embodiments, the information associated with the result set of users of the media content provider includes (732) information related to one or more of gender, age, geographic location, language, profession, or user account type. In some embodiments, the information associated with the result set of users of the media content provider further includes (734) historical information related to interactions of the result set of users with the media content provider. For example, the historical information includes information about playlists, listening sessions, preferred music, purchase history, etc., associated with the result set of users.

Generating a result set of users for transmission to a device of a user based on a determined proxy media content item reduces input required from a user (e.g., by enabling a user to provide only an indication of new media content, without the need for the user to perform additional searches and analyses of content in the media content library). Reducing the number of inputs required to generate a result set of users increases the efficiency of the device (e.g., by reducing the need for the user to peruse the media content library selecting and/or listening to a series media content items in order to determine a result set of related media content items and identifying the users associated with the related media content items. Increasing the efficiency with which a media-providing service generates a result set of users reduces the processing power required to generate such results (e.g., by reducing the amount of user interaction required).

Although FIGS. 7A-7C illustrate a number of logical stages in a particular order, stages which are not order dependent may be reordered and other stages may be combined or broken out. Some reordering or other groupings not specifically mentioned will be apparent to those of ordinary skill in the art, so the ordering and groupings presented herein are not exhaustive. Moreover, it should be recognized that the stages could be implemented in hardware, firmware, software, or any combination thereof.

The foregoing description, for purpose of explanation, has been described with reference to specific embodiments. However, the illustrative discussions above are not intended to be exhaustive or to limit the embodiments to the precise forms disclosed. Many modifications and variations are possible in view of the above teachings. The embodiments were chosen and described in order to best explain the principles and their practical applications, to thereby enable others skilled in the art to best utilize the embodiments and various embodiments with various modifications as are suited to the particular use contemplated.

What is claimed is:

1. A method, comprising:
at a server system of a media-providing service, the server system having one or more processors and memory storing instructions for execution by the one or more processors:
determining a result set of media content items that is related to a respective media content item that does not satisfy a popularity criterion, wherein the popularity criterion for the respective media content item is based on, a number of users that have requested the respective media content item, including:

receiving an indication of the respective media content item from a device of a first user of a media content provider;

determining a first set of values that correspond to characteristics of the respective media content item;

selecting, by the server system, a proxy media content item for the respective media content item, that is not the same media content item as the respective media content item, wherein the selecting is based on:

the proxy media content item having a second set of values that meets similarity criteria for the first set of values and is selected from a defined set of media content items, and a determination that the proxy media content item satisfies the popularity criterion;

after selecting the proxy media content item, generating, using the proxy media content item as a proxy for the respective media content item, the result set of media content items that is associated with the respective media content item;

determining a result set of users of the media content provider associated with the result set of media content items; and transmitting, to the device of the first user, information associated with the result set of users of the media content provider.

2. The method of claim 1, further including, prior to transmitting, to the device of the first user, the information associated with the result set of users of the media content provider:

identifying a first set of users of the media content provider that have previously received a media content item associated with the first user; and removing, from the result set of users, the first set of users.

3. The method of claim 1, further including, prior to transmitting, to the device of the first user, the information associated with the result set of users of the media content provider:

identifying a second set of users of the media content provider, the second set of users including users that have not received, from the media content provider, a threshold number of media content items of the result set of media content items, in a defined time period; and removing, from the result set of users, the second set of users.

4. The method of claim 3, wherein the second set of users of the media content provider further includes users that have not performed a threshold number of searches for one or more media content items of the result set of media content items in the defined time period.

5. The method of claim 3, wherein the second set of users of the media content provider further includes users that have not created a threshold number of playlists including one or more media content items of the result set of media content items in the defined time period.

6. The method of claim 1, wherein the information associated with the result set of users of the media content provider includes information related to one or more of gender, age, geographic location, language, profession, or user account type.

7. The method of claim 6, wherein the information associated with the result set of users of the media content provider further includes historical information related to interactions of the result set of users with the media content provider.

8. The method of claim 1, wherein the respective media content item is distinct from the defined set of media content items.

9. The method of claim 8, wherein the defined set of media content items includes media content items of the media content provider that meet playback criteria.

10. The method of claim 1, wherein the similarity criteria include criteria that are met in accordance with a determination that the second set of values has a closest vector distance in vector space to the first set of values.

11. A server system of a media-providing service, comprising:

one or more processors; and memory storing instructions for execution by the one or more processors, the instructions including:

determining a result set of media content items that is related to a respective media content item that does not satisfy a popularity criterion, wherein the popularity criterion for the respective media content item is based on, a number of users that have requested the respective media content item, including:

receiving an indication of the respective media content item from a device of a first user of a media content provider;

determining a first set of values that correspond to characteristics of the respective media content item;

selecting, by the server system, a proxy media content item for the respective media content item, that is not the same media content item as the respective media content item, wherein the selecting is based on:

the proxy media content item having a second set of values that meets similarity criteria for the first set of values and is selected from a defined set of media content items, and a determination that the proxy media content item satisfies the popularity criterion;

after selecting the proxy media content item, generating, using the proxy media content item as a proxy for the respective media content item, the result set of media content items that is associated with the respective media content item;

determining a result set of users of the media content provider associated with the result set of media content items; and transmitting, to the device of the first user, information associated with the result set of users of the media content provider.

12. A non-transitory computer-readable storage medium storing one or more programs for execution by one or more processors of a server system, the one or more programs including instructions for:

determining a result set of media content items that is related to a respective media content item that does not satisfy a popularity criterion, wherein the popularity criterion for the respective media content item is based on, a number of users that have requested the respective media content item, including:

receiving an indication of the respective media content item from a device of a first user of a media content provider;

determining a first set of values that correspond to characteristics of the respective media content item;

selecting, by the server system, a proxy media content item for the respective media content item, that is not the same media content item as the respective media content item, wherein the selecting is based on:
    the proxy media content item having a second set of values that meets similarity criteria for the first set of values and is selected from a defined set of media content items, and
    a determination that the proxy media content item satisfies the popularity criterion;
  after selecting the proxy media content item, generating, using the proxy media content item as a proxy for the respective media content item, the result set of media content items that is associated with the respective media content item;
  determining a result set of users of the media content provider associated with the result set of media content items; and
  transmitting, to the device of the first user, information associated with the result set of users of the media content provider.

13. The server system of claim 11, the instructions further including instructions for, prior to transmitting, to the device of the first user, the information associated with the result set of users of the media content provider:
  identifying a first set of users of the media content provider that have previously received a media content item associated with the first user; and
  removing, from the result set of users, the first set of users.

14. The server system of claim 11, the instructions further including instructions for, prior to transmitting, to the device of the first user, the information associated with the result set of users of the media content provider:
  identifying a second set of users of the media content provider, the second set of users including users that have not received, from the media content provider, a threshold number of media content items of the result set of media content items, in a defined time period; and
  removing, from the result set of users, the second set of users.

15. The server system of claim 14, wherein the second set of users of the media content provider further includes users that have not performed a threshold number of searches for one or more media content items of the result set of media content items in the defined time period.

16. The server system of claim 14, wherein the second set of users of the media content provider further includes users that have not created a threshold number of playlists including one or more media content items of the result set of media content items in the defined time period.

17. The server system of claim 11, wherein the information associated with the result set of users of the media content provider includes information related to one or more of gender, age, geographic location, language, profession, or user account type.

18. The server system of claim 17, wherein the information associated with the result set of users of the media content provider further includes historical information related to interactions of the result set of users with the media content provider.

19. The server system of claim 11, wherein the respective media content item is distinct from the defined set of media content items.

20. The server system of claim 19, wherein the defined set of media content items includes media content items of the media content provider that meet playback criteria.

21. The method of claim 1, wherein the popularity criterion includes a determination that a total number of times that the respective media content item has been streamed is above a threshold number of times, a total number of users that have requested the respective media content item for playback is above a threshold number of users, and/or a user-input average rating of the respective media content item is above a threshold rating.

\* \* \* \* \*